United States Patent
Shemwell

[11] Patent Number: 5,982,299
[45] Date of Patent: Nov. 9, 1999

[54] LASER BASED VISUAL LANDING AIDS AND METHOD FOR IMPLEMENTING SAME

[75] Inventor: David M. Shemwell, Seattle, Wash.

[73] Assignee: Cafaro Laser, Ltd., Youngstown, Ohio

[21] Appl. No.: 08/514,104

[22] Filed: Aug. 11, 1995

[51] Int. Cl.⁶ ..................... G08G 5/00
[52] U.S. Cl. .................. 340/953; 73/178 T; 244/114 R; 340/954; 340/955; 340/956
[58] Field of Search ................ 340/947, 952, 340/953, 954, 955, 956; 244/114 R; 73/178 T; 342/33

[56] References Cited

U.S. PATENT DOCUMENTS

| | | | |
|---|---|---|---|
| 3,138,779 | 6/1964 | Murray, Jr. et al. | 340/955 |
| 3,354,428 | 11/1967 | Projector et al. | 340/955 |
| 3,447,129 | 5/1969 | Birmingham et al. | 340/955 |
| 3,648,229 | 3/1972 | Burrows et al. | 340/955 |
| 3,885,876 | 5/1975 | Konopka | 340/955 |
| 4,170,767 | 10/1979 | Tanner | 340/955 |
| 4,301,468 | 11/1981 | Alvarez | 358/64 |
| 4,667,196 | 5/1987 | Kaul | 340/954 |
| 5,032,961 | 7/1991 | Pouyanne et al. | 340/953 |
| 5,052,790 | 10/1991 | Edwards et al. | 359/399 |
| 5,287,104 | 2/1994 | Shemwell | 340/955 |
| 5,521,999 | 5/1996 | Chuang et al. | 385/88 |

*Primary Examiner*—Brent A. Swarthout
*Attorney, Agent, or Firm*—Squire, Sanders & Dempsey L.L.P.

[57] ABSTRACT

In this application are disclosed a variety of improvements to the original system. These improvements provide for greater utility, effectiveness, and ease of manufacturing of the laser visual landing aid system.

9 Claims, 4 Drawing Sheets

LASER BASED VISUAL LANDING AIDS AND METHOD FOR IMPLEMENTING SAME

TECHNICAL FIELD

The present invention relates to methods and apparatus for aiding landing aircraft, and more particularly, landing aids for better defining landing corridor azimuths and for separating parallel runways for sea- and land-based approach aids, and portable solar powered installations.

BACKGROUND OF THE INVENTION

The prior art discloses laser based aids to navigation, with particular application to landing, which use a series of low power visible lasers to illuminate corridors of sky which define the proper approach path. In the basic embodiment the system uses three colors: Amber (or yellow) to indicate on course, red to indicate left of course, and green to indicate right of course. In addition when well left or right of course the colors are made to blink, first slow and then fast.

There are two such systems. One defines the extended centerline of the landing area and the other defines the proper glideslope. In practice there are aspects of the basic design which are not optimal, and specific additions and delineations which improve the overall performance of the system are desirable. In particular, it is possible for the flashing corridors to become confused with aircraft beacons or other flashing lights which are known to be found in the vicinity of the approach corridor. Also, modifications to the corridor size produce better approach performance by optimizing the match between corridor size and aircraft flight characteristic. Further, light scattering from the lens of the exit aperture of the current art design can cause distractions to the pilot during the final stages of the approach. Still further, modifications to the basic design disclosed in this patent provide for greater ease in maintenance by allowing easy and exact replacement of laser which is necessary due to the limited lifetime of the laser, and changes to the optical design allows for easier and more cost effective manufacturing.

SUMMARY OF THE INVENTION

According to one aspect, the invention is a visual aid for azimuthal guidance of landing aircraft. The aid defining landing corridors, including a central fan-shaped corridor and second, third, fourth and fifth corridors. The central corridor is continuously filled with a first color of light. The second and third fan-shaped corridors are adjacent the two fan-shaped surfaces of the central corridor and are respectively continuously filled with second and third colors of light which differ from the first color of light. The fourth and fifth fan-shaped corridors are respectively adjacent the two fan-shaped surfaces of the second and third corridors and are respectively intermittently filled with the second and third colors of light at a first rate.

According to a second aspect, the invention is a method for producing a visual aid for azimuthal guidance of landing aircraft. The method includes the steps of a) providing a central fan-shaped corridor continuously filled with a first color of light and b) providing second and third fan-shaped corridors adjacent the two fan-shaped surfaces of the central corridor, the second and third corridors being respectively continuously filled with second and third colors of light which differ from the first color of light. The method also includes the steps of c) providing fourth and fifth fan-shaped corridors respectively adjacent the two fan-shaped surfaces of the second and third corridors, the fourth and fifth corridors being respectively intermittently filled with the second and third colors of light at a first rate, and d) providing sixth and seventh fan-shaped corridors respectively adjacent the two fan-shaped surfaces of the fourth and fifth corridors, the sixth and seventh corridors being respectively intermittently filled with the second and third colors of light at a second rate that is different from the first rate.

DETAILED DESCRIPTION OF THE PREFERRED EMBODIMENTS OF THE INVENTION

According to one aspect, the invention is a series of improvements to laser based visual landing aids which makes the devices optimal and manufacturable. The first aspect is a construction of corridor angular widths which optimize the interception of the centerline by the approaching aircraft and optimize the subsequent centerline tracking. This is accomplished by using a specific non-linear sequence of corridor width designed around the specific behavior of the aircraft in a given environment.

Figure 1:
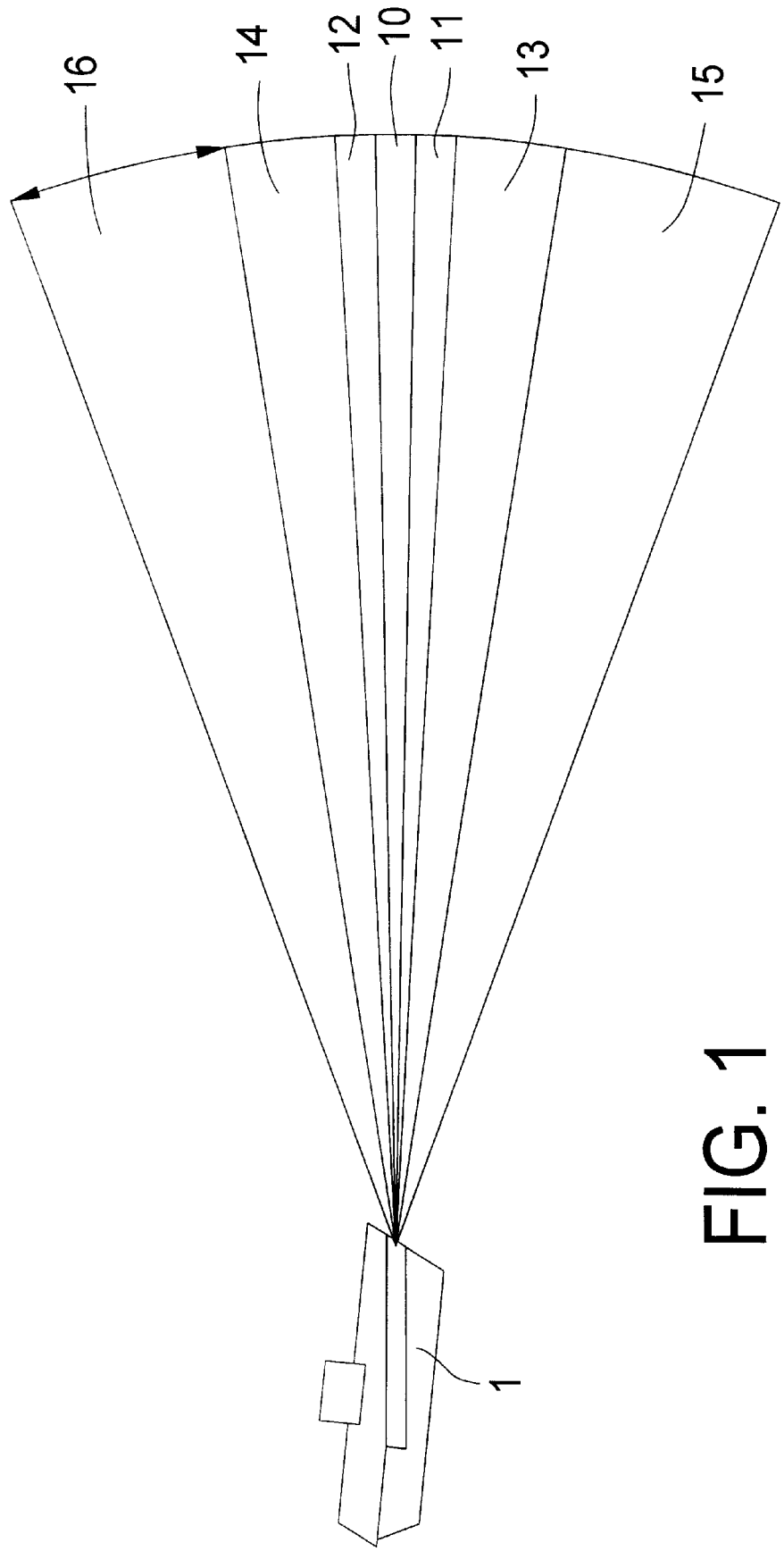
FIG. 1 is a schematic diagram of a laser visual landing aid corridor design for azimuthal guidance for an approach to an aircraft carrier.

For the purposes of this invention we will consider three different environments: the aircraft carrier, land-based landing field, and helicopter landing zone both land- and sea-based. FIG. 1 is a schematic diagram of a laser visual landing aid corridor design for azimuthal guidance for an approach to an aircraft carrier. In the case of the aircraft carrier environment the optimal configuration for the approach corridors is the following, the corridors being shown from above emanating from the stern 1 of the aircraft carrier. Beginning with an amber centerline (first) corridor 10, the azimuthal angular width should be 0.5 degrees plus or minus 0.1 degrees. Adjacent to the centerline corridor 10 are red (first) and green (second) corridors (11 and 12, respectively) which are adjacent to the fan surfaces of the centerline corridor 10 and 0.8 degrees wide in azimuth (plus or minus 0.1 degree). The corridors 10–12 are continuously illuminated and not interrupted temporally. Adjacent to either of the steady red or steady green corridors 11 and 12, respectively, and further outboard of the centerline corridor 10 are respectively red (fourth) and green (fifth) corridors (13 and 14, respectively) which are interrupted by a conventional mechanical chopper or under control of an electrical signal which causes the fourth and fifth corridors 13 and 14 to appear to flash a periodic pattern at a slow rate (say, 35–40 times per minute). The optimal angular thickness of the fourth and fifth corridors 13 and 14 is approximately 3.0 degrees with 10% variations. Finally, adjacent to the slowly flashing fourth and fifth corridors 13 and 14 (and further outboard from the centerline corridor 10) are respective red and green (i.e., sixth and seventh) corridors 15 and 16 which are interrupted in such a way as to make them appear to flash a periodic pattern rapidly relative to the slowly flashing fourth and fifth corridors 13 and 14 (such as the conventional chopper or electrical signal control described above). The azimuthal angular widths of these sixth and seventh corridors 15 and 16 are approximately 6.0 degrees, plus or minus 10%. All of the corridors 11–16 have an angular height (in elevation) of 4 to 5 degrees. In addition, the elevation of the upper edge of the corridors 11–16 is set so that an aircraft on the normal glideslope to the aircraft carrier 1 passes out of the coverage of the landing aid system when the aircraft is at 0.5 nautical miles (nm) (plus or minus 0.1 nm) from the normal touch-down point on the landing deck of the aircraft carrier 1. Furthermore, the vertical extent of the corridors is in the range of 4.0 to 5.0 degrees, and oriented such that an aircraft on a normal glideslope passes through the upper edge of the corridor coverage at a predetermined distance such as 0.5 nm from the touch down zone. The exact distance can be varied as necessary for any particular application, although it is expected that this distance will typically be in the range of 0.4 to 0.6 nm. The corridor design described above is the preferred configuration for an aircraft carrier-based laser visual landing aid for azimuthal guidance and is one embodiment of this invention.

Figure 2:
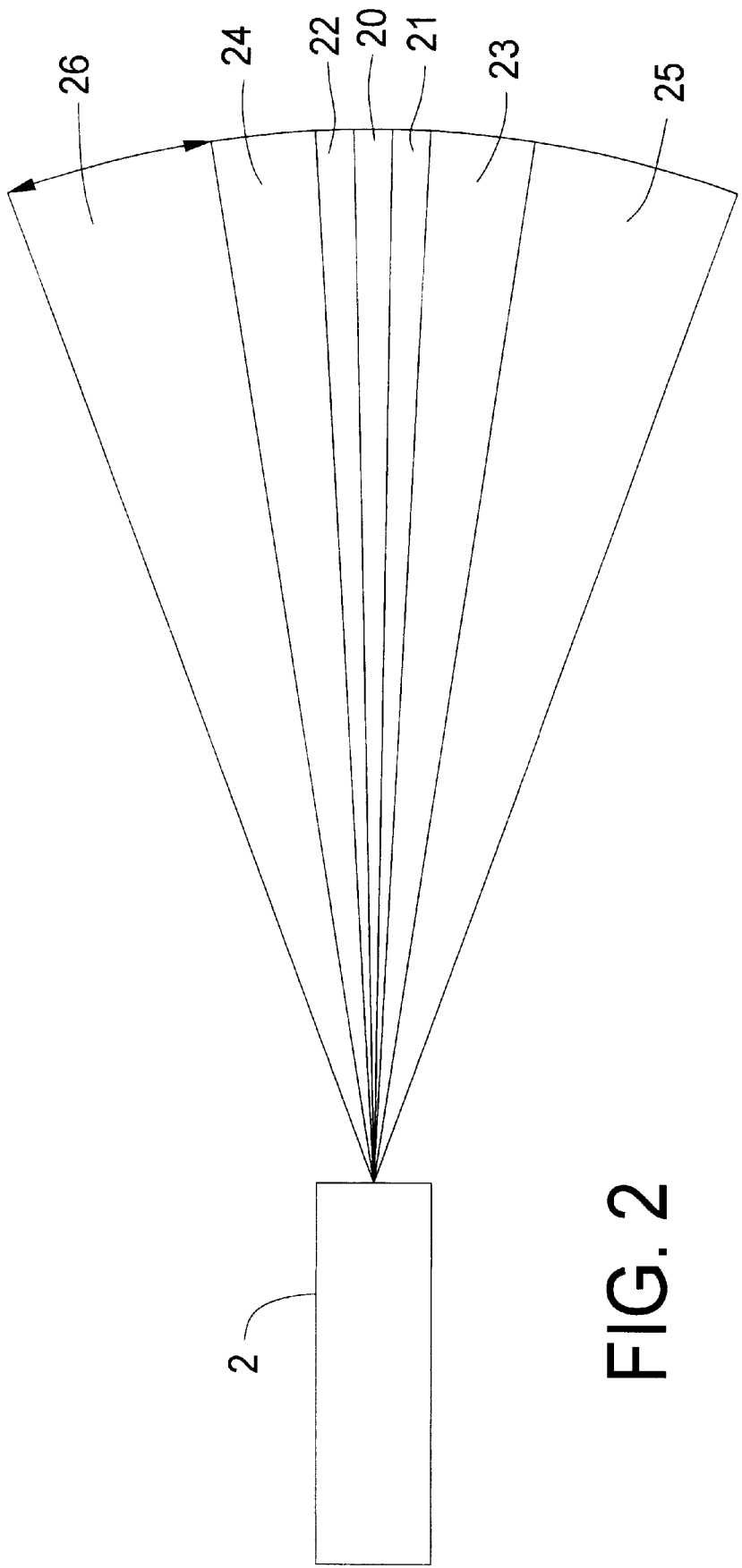
FIG. 2 is a schematic diagram of a laser visual landing aid corridor design for azimuthal guidance for an approach to a land-based landing field.

Land-based applications of laser visual landing aids can be very beneficial for parallel runway separation, low cost replacements for normal approach lighting and emergency airfield lighting. Land-based applications have slightly different requirements than sea-based applications, and a different corridor design is necessary to optimize land-based system performance. FIG. 2 is a schematic diagram of a laser visual landing aid corridor design for azimuthal guidance for an approach to a land-based landing field. In the case of the land-based centerline guidance systems for use with a land-based runway 2 the azimuthal corridor widths are as follows: the centerline amber (first) corridor 20 is 0.5 degree wide, plus or minus 0.1 degree, the steady red and green (second and third) corridors 21 and 22 are 0.8 degree wide plus or minus 0.1 degree, the slowly flashing red and green (fourth and fifth) corridors 23 and 24 are 1.5 degrees wide, plus or minus 0.15 degree, and the rapidly flashing red and green (sixth and seventh) corridors 26 and 27 are 2.25 degrees wide in azimuth, plus or minus 0.225 degree. In each case the corridors 21–27 are 4 to 5 degrees high (in elevation). Although individual installation may require slight variations, the lowest portions of the corridors 21–27 are between 0 and 1 degrees above the runway. Land-based applications of laser visual landing aids can be enhanced by using two or more complete visual aid landing systems (of the sort just described) disposed along the extended centerline or glideslope plane which is defined relative to the runway 2. This produces a distinctive visual appearance which improves pilot recognition of the landing area. This corridor design, together with the use of one or more systems for a distinctive display in a land-based application, is a second embodiment of the invention.

Figure 3:
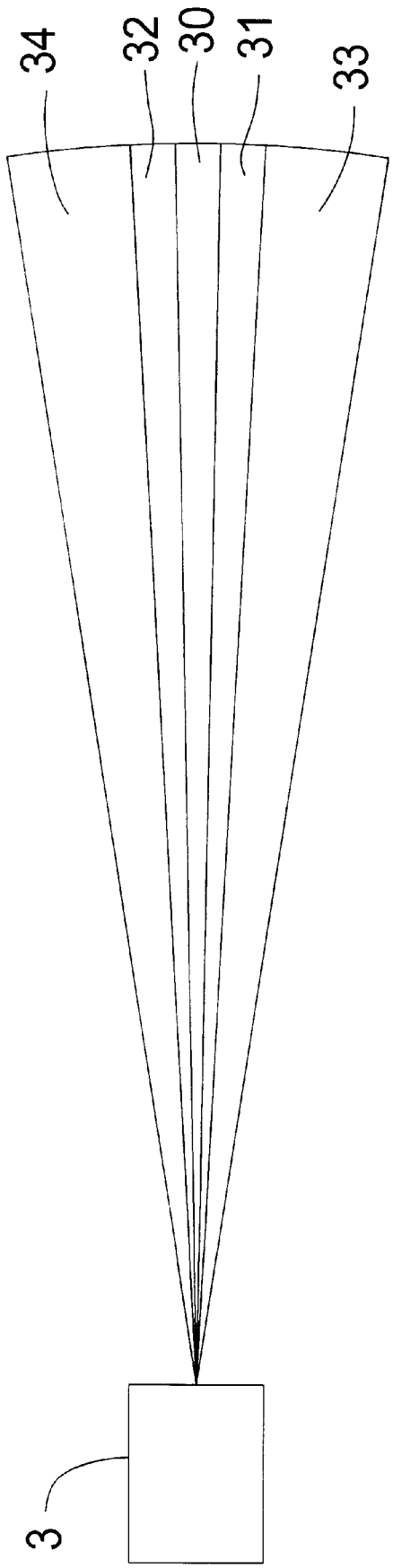
FIG. 3 is a schematic diagram of a laser visual landing aid corridor design for azimuth guidance for an approach to a helicopter landing pad.

Helicopter operations in land- and sea-based environments will also find the system a valuable enhancement for safety. FIG. 3 is a schematic diagram of a laser visual landing aid corridor design for azimuth guidance for an approach to a helicopter landing zone (or pad). Due to the unique character of helicopters and helicopter landing zones 2, a different corridor design is used for such applications. In such cases, the central amber (first) corridor 30 is slightly wider than for carrier- or land-based fixed wing aircraft facilities. For helicopter landing zone landing aid system, the central corridor 30 is 0.6 degree in width, plus or minus 0.1 degree. The steady red and green (second and third) corridors 31 and 32 remain at 0.8 degree plus or minus 0.1 degree, and the slowly flashing red and green (fourth and fifth) corridors 33 and 34 are widened to 0.4 degree, plus or minus 0.04 degree. There are no rapidly flashing corridors in this design. Vertical height of each of the corridors 30–34 is in the range of 4 to 5 degrees. This corridor design, specific to helicopter applications is a third embodiment of this invention.

Figure 4:
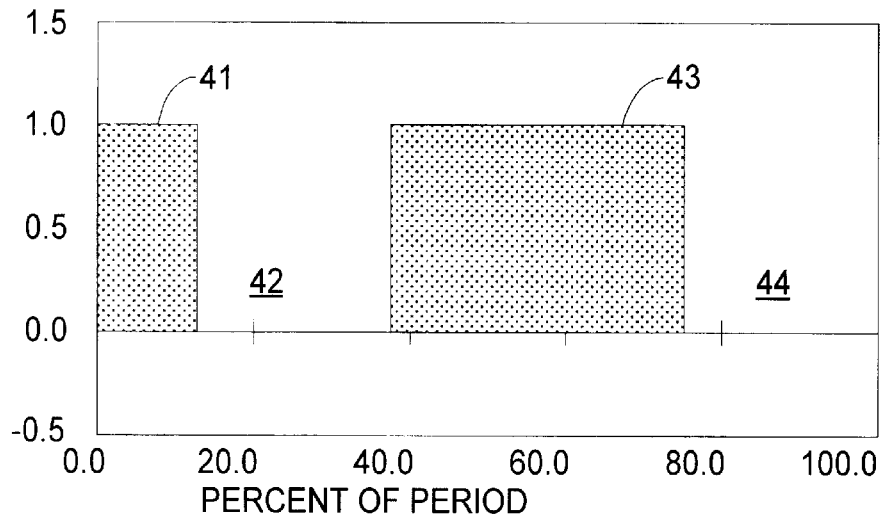
FIG. 4 is a schematic diagram showing the temporal pattern of the dot-dash flash rate for both the slowly flashing and rapidly flashing corridors.

Another aspect of this invention is a change in the design of the flashing corridors. In the current art the flashing corridors flash in a standard repetitious on/off fashion. The simple rhythm of the standard flash is designed to alert the pilot to deviations well off the desired centerline or glideslope. In practice this simple flashing scheme can be confused with flashing beacon lights aboard other aircraft or on the ground. This confusion can reduce the utility of the current art. In this invention the design of the flashing corridor is changed and a rhythm composed of a short pulse followed by a long pulse is introduced. FIG. 4 is a schematic diagram showing the temporal pattern of the dot-dash flash rate for both the slowly flashing and rapidly flashing corridors. The pattern of repeating short and long pulses allows the pilot to distinguish the laser system from other lights, particularly at long range. In this design the "dot" portion of the pulse is approximately 12.5% of the total cycle, the space between the dot and the dash is approximately 25% of the cycle, the dash is approximately 37.5% of the cycle, and the following space before the dot is repeated is approximately 25% of the cycle. This allows the dash period to be approximately three times as long as the dot period. These proportions are the same for the slow and rapid flash rates both of which use the dot/dash scheme. For the slowly flashing signal this entire pattern is repeated 35 to 40 times per minute. For the rapidly flashing signal this entire pattern is repeated 60 to 70 times per minute.

Figure 5:
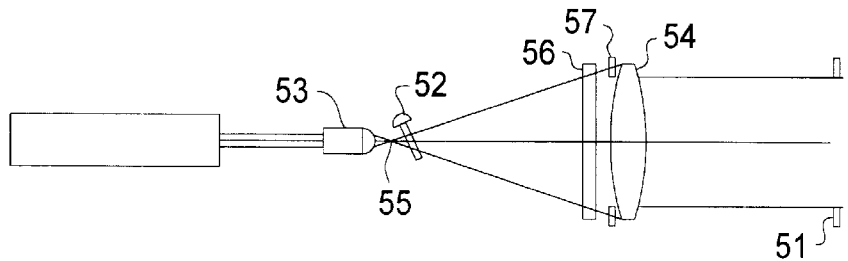
FIG. 5 is a schematic diagram of the optical beam train for a single laser corridor.

An additional aspect of this invention is a modification to the optical design of the visual landing aid system. FIG. 5 is a schematic diagram of the optical beam train for a single laser corridor of the visual landing aid system as described above. In the current art, light from a light source such as a laser 50 scattered off of the collimating objective lens 54 at the exit of the beam train can sometimes be seen by pilots. This scattered light is not part of the signal and can cause distractions and confusion on the part of the pilot. This invention includes a system of baffles integrated into the weather cover which prevent most of the scattered light from radiating out into the approach area effectively solving this. The baffle system is composed of a series of barriers which are located between the exit apertures of the various laser beams and are parallel to their direction of propagation. These prevent scattered light from the objective lens 54 from propagating into the adjacent corridor. In addition, on the front of a weather shield is a barrier plate 51 which is perpendicular to the direction of laser beam propagation. Rectangular holes are cut in the barrier plate 51. These holes are designed to allow the direct beam through while blocking off-axis scatter. Using this technique the problem associated with scattered light is effectively suppressed, with an additional benefit of enhanced weather protection for the objective lens 54.

Further improvements provide for methods and means to improve the manufacturability and maintainability of the laser visual landing aid of the present invention. In particular, during the fabrication of the landing aid, relatively critical co-alignments of the corridors are necessary. Current art provides for laser light from either the laser or a fiber optic (which will be understood by those skilled in the art of lasers and fiber optics) to be directed through a beam-expanding lens (usually a microscope objective, such as shown with reference number 53 in FIG. 5) and then subsequently shaped by an optional cylindrical lens 56, objective lens 54 and corridor definition mask 57. In principle, the necessary co-alignment must be made through the precise location of each of these components. This method requires a fair amount of effort, making fabrication an expensive process. In this invention an additional optical element 52 is added to the beam train to allow for ease of corridor alignment. Typically this element will be an optical flat but in some cases it can be a lens. The optical element 52 is placed near the focus of the beam expander telescope (including the microscope objective 53 and the objective lens 54) or in any location where the beam is relatively small. By tilting the optical element 52 it is then possible to steer the direction of propagation of the corridor. This steerage occurs due to the apparent shift of the position of the beam focus. In this invention each one of the optical beam trains (one for each corridor) has such an optical element 52. By manipulating the direction of propagation of each corridor relative to the others via these tiltable optical elements 52 it is possible to fully align the system with only modest positional requirement for the optical elements within the beam train. This will reduce the cost in effort required to manufacture such a system.

Figure 6:
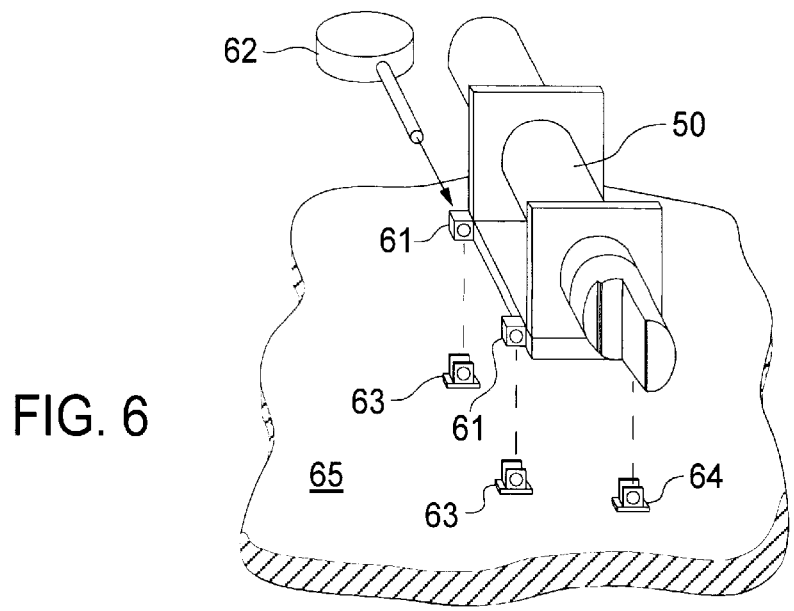
FIG. 6 is a schematic diagram of the laser mounting cassette of the inventive system, showing the precision expanding latching pins, and the tangs and clevis.

Eventually the laser light sources within the landing aid will require replacement due to damage or age. In the current art each laser is mounted as an individual and each replacement laser must be manually adjusted once the laser is placed in the laser visual landing aid. This requires a trained technician at the site of the replacement. To improve the practicality and reduce the expense of in-field replacements a different approach is required. In this invention the laser is placed into a cassette 60 which can be aligned when manufactured. FIG. 6 is a schematic diagram of the laser mounting cassette 60 of the inventive system, showing the precision expanding latching pins 62, and the tangs 63 and clevis 61. Exact placement of the laser cassette 60 within the device is accomplished using a series of pins and brackets. In particular to assure proper alignment of the cassette, at three different positions along the base of the cassette 60 are located the devises 61 with approximately 0.25 inch diameter holes which are oriented along the axis of the laser beam propagation. These holes are designed to fit the precision pin 62, or an expanding pin of the Carr Lane type CL- 4-EXP-1.00. These expanding pins allow for precision location when set, with a reduced diameter for easy insertion and removal when released. On the base plate 65 of the landing aid device are three upright tangs 63 which also receive the precision pins 62. These tangs 63 fit within the devises so that when the pins 62 are inserted the laser cassette 60 is held firmly against the base 65. In particular to assure an accurate placement of the cassette 60 without over-constraining and distorting it, two of these tangs 63 located on the same side of the cassette have circular holes of the same diameter of the hose in the clevis 61. These tangs 63 are placed on the base 65 so that the holes are lined up along the direction of propagation of the laser beam. The third tang 64, located on the opposite side of the cassette 60, has a slotted shaped hole which locates the pin vertically but allows motion side-to-side to prevent over-constraints. By fabricating the device in this fashion it will be possible for easy field replacement of laser cassette 60 reducing the cost and increasing the utility of laser visual landing aid.

It will be appreciated by those skilled in the art that the systems described in the foregoing could be powered by any appropriate source of electrical energy. Because of the high electrical efficiency of the systems described previously due to their efficient corridor design, the corresponding low power requirements will allow the systems to be powered by solar cell charged batteries in accordance with conventional practice. This is not possible with ordinary approach lighting systems.

While the foregoing is a detailed description of the preferred embodiment of the invention, there are many alternative embodiments of the invention that would occur to those skilled in the art and which are within the scope of the present invention. Accordingly, the present invention is limited only by the following claims.

I claim:

1. A landing aid system for azimuthal guidance of aircraft toward a landing in a predetermined direction along a predetermined centerline plane, the landing aid system comprising:

A) a centerline visual aid employing a first plurality of laser-based light sources defining a corresponding first plurality of landing corridors including:
   1) a first, central, fan-shaped corridor continuously filled with a first color of light, the first corridor having an angular width falling within a range of 0.4 degrees to 0.6 degrees;
   2) second and third fan-shaped corridors disposed respectively adjacent and on opposite sides of the first corridor, the second and third corridors being respectively continuously filled with second and third colors of light which differ from the first color of light, the second and third corridors each having angular widths falling within the range of 0.7 degrees to 0.9 degrees;
   3) fourth and fifth fan-shaped corridors disposed respectively adjacent and outboard the second and third corridors, the fourth and fifth corridors being respectively intermittently filled, employing a repetitive asymmetrical patten, with the second and third colors of light at a first rate falling within the range of 35 to 40 times per minute, the fourth and fifth corridors each having angular widths falling within the range of 1.35 degrees to 1.65 degrees;
   4 sixth and seventh fan-shaped corridors disposed respectively adjacent and outboard the fourth and fifth corridors, the sixth and seventh corridors being respectively intermittently filled, employing a repetitive asymmetrical pattern, with the second and third colors of light at a second rate which is higher than the first rate, the sixth and seventh corridors each having angular widths falling within the range of 2.025 degees to 2.475 degrees.

2. The landing aid system of claim 1 which further includes:

A) a glidepath visual aid employing a second plurality of laser-based light sources defining a corresponding second plurality of landing corridors including:
   1) an eighth, central, fan-shaped corridor continuously filled with the first color of light, the eighth corridor having an angular height falling within the range of 0.4 degrees to 0.6 degrees;

2) ninth and tenth fan-shaped corridors disposed respectively adjacent and on opposite sides of the eighth corridor, the ninth and tenth corridors being respectively continuously filled with the second and third colors of light, the ninth and tenth corridors each having angular heights falling within the range of 0.7 to 0.9 degrees;

3) eleventh and twelfth fan-shaped corridors disposed respectively adjacent and outboard the ninth and tenth corridors, the eleventh and twelfth corridors being respectively intermittently filled, employing a repetitive asymmetrical pattern, with the second and third colors of light at a first rate falling within the range of 35 to 40 times per minute, the eleventh and twelfth corridors each having angular heights falling within the range of 1.35 degrees to 1.65 degrees; and 4) thirteenth and fourteenth fan-shaped corridors disposed respectively adjacent and outboard the eleventh and twelfth corridors, the thirteenth and fourteenth corridors being respectively intermittently filled, employing a repetitive asymmetrical pattern, with the second and third colors of light at a second rate which is higher than the first rate, the thirteenth and fourteenth corridors each having angular heights falling within the range of 2.025 degrees to 2.475 degrees.

3. The landing aid system of claim 1 in which each laser-based light source includes an adjustable optical element to position the corridor defined thereby with respect to the other corridors.

4. The landing aid system of claim 1 which further includes a solar-charged battery power source for energizing the system.

5. A landing aid system for azimuthal guidance of aircraft toward a landing on an aircraft carrier in a predetermined direction along a predetermined centerline plane, the landing aid system comprising:

A) a centerline visual aid employing a plurality of laser-based light sources defining a corresponding plurality of landing corridors including:

1) a first, central, fan-shaped corridor continuously filled with a first color of light, the first corridor having an angular width falling within a range of 0.4 degrees to 0.6 degrees and an angular height of 4.0 to 5.0 degrees;

2) second and third fan-shaped corridors disposed respectively adjacent and on opposite sides of the first corridor, the second and third corridors being respectively continuously filled with second and third colors of light which differ from the first color of light, the second and third corridors each having angular widths falling within the range of 0.7 degrees to 0.9 degrees and angular heights of falling within the range of 4.0 to 5.0 degrees;

3) fourth and fifth fan-shaped corridors disposed respectively adjacent and outboard the second and third corridors, the fourth and fifth corridors being respectively intermittently filled, employing a repetitive asymmetric pattern, with the second and third colors of light at a first rate falling within the range of 35 to 40 times a minute, the fourth and fifth corridors each having angular widths falling within the range of 2.7 degrees and 3.3 degrees and angular heights falling within the range of 4.0 to 5.0 degrees; and 4) sixth and seventh fan-shaped corridors disposed respectively adjacent and outboard the fourth and fifth corridors, the sixth and seventh corridors being respectively intermittently filled, employing a repetitive asymmetric pattern, with the second and third colors of light at a second rate which is higher than the first rate, the sixth and seventh corridors each having angular widths falling within the range of 5.4 degrees to 6.6 degrees and angular heights falling within the range of 4.0 to 5.0 degrees.

6. The landing aid system of claim 5 in which each laser-based light source includes an adjustable optical element to position the corridor defined thereby with respect to the other corridors.

7. A method for effecting azimuthal guidance of aircraft toward a landing in a predetermined direction along a predetermined centerline plane comprising:

A) employing a centerline visual aid having a first plurality of laser-based light sources defining a corresponding first plurality of landing corridors;

B) mutually aligning and controlling the first plurality of laser-based light sources such that:

1) a first, central, fan-shaped corridor:
   a) is continuously filled with a first color of light; and
   b) the first corridor having an angular width falling within a range of 0.4 degrees to 0.6 degrees;

2) second and third fan-shaped corridors:
   a) are disposed respectively adjacent and on opposite sides of the first corridor;
   b) are respectively continuously filled with second and third colors of light which differ from the first color of light; and
   c) each have angular widths falling within the range of 0.7 degrees to 0.9 degrees;

3) fourth and fifth fan-shaped corridors:
   a) are disposed respectively adjacent and outboard the second and third corridors;
   b) are respectively intermittently filled, employing a repetitive asymmetric pattern, with the second and third colors of light at a first rate failing within the range of 35 to 40 times per minute; and
   c) each have angular widths falling within the range of 1.35 degrees to 1.65 degrees;

4) sixth and seventh fan-shaped corridors:
   a) are disposed respectively adjacent and outboard the fourth and fifth corridors;
   b) are respectively intermittently filled, employing a repetitive asymmetric pattern, with the second and third colors of light at a second rate which is higher than the first rate; and
   c) each have angular widths falling within the range of 2.025 degrees to 2.475 degrees.

8. The method of claim 7 which further includes:

A) employing a glideslope visual aid having a second plurality of laser-based light sources defining a corresponding second plurality of landing corridors; and B) mutually aligning and controlling the second plurality of laser-based light sources such that:

1) an eighth, central, fan-shaped corridor:
   a) is continuously filled with the first color of light; and
   b) has an angular width falling within the range of 0.4 degrees to 0.6 degrees;

2) ninth and tenth fan-shaped corridors:
   a) are disposed respectively adjacent and on opposite sides of the eighth corridor;
   b) are respectively continuously filled with the second and third colors of light; and
   c) each have angular widths falling within the range of 0.7 degrees to 0.9 degrees;

3) eleventh and twelfth fan-shaped corridors:
   a) are disposed respectively adjacent and outboard the ninth and tenth corridors;
   b) are respectively intermittently filled, employing a repetitive asymmetric pattern, with the second and third colors of light at a first rate falling within the range of 35 to 40 times per minute; and
   c) each have widths falling within the range of 1.35 degrees to 1.65 degrees; and
4) thirteenth and fourteenth fan-shaped corridors:
   a) are disposed respectively adjacent and outboard the eleventh and twelfth corridors;
   b) are respectively intermittently filled, employing a repetitive asymmetric pattern, with the second and third colors of light at a second rate which is higher than the first rate; and
   c) each have angular widths falling within the range of 2.025 degrees to 2.475 degrees.

9. A method for effecting azimuthal guidance of aircraft toward a landing on an aircraft carrier in a predetermined direction along a predetermined centerline plane comprising:
  A) employing a centerline visual aid having a plurality of laser-based light sources defining a corresponding plurality of landing corridors; and
  B) mutually aligning and controlling the plurality of laser-based light sources such that:
    1) a first, central, fan-shaped corridor:
       a) is continuously filled with a first color of light;
       b) has an angular width falling within a range of 0.4 degrees to 0.6 degrees; and
       c) an angular height of 4.0 to 5.0 degrees;
    2) second and third fan-shaped corridors:
       a) are disposed respectively adjacent and on opposite sides of the first corridor;
       b) are respectively continuously filled with second and third colors of light which differ from the first color of light;
       c) each have angular widths falling within the range of 0.7 degrees to 0.9 degrees; and
       d) each have angular heights of falling within the range of 4.0 to 5.0 degrees;
    3) fourth and fifth fan-shaped corridors:
       a) are disposed respectively adjacent and outboard the second and third corridors;
       b) are respectively intermittently filled, employing a repetitive asymmetric pattern, with the second and third colors of light at a first rate falling within the range of 35 to 40 times a minute;
       c) each have angular widths falling within the range of 2.7 degrees and 3.3 degrees; and
       d) each have angular heights falling within the range of 4.0 to 5.0 degrees; and
    4) sixth and seventh fan-shaped corridors:
       a) are disposed respectively adjacent and outboard the fourth and fifth corridors;
       b) are respectively intermittently filled, employing a repetitive asymmetric pattern, with the second and third colors of light at a second rate which is higher than the first rate;
       c) each have angular widths falling within the range of 5.4 degrees to 6.6 degrees; and
       d) each have angular heights falling within the range of 4.0 to 5.0 degrees.

* * * * *